US009970587B2

(12) United States Patent
    Armenta

(10) Patent No.: US 9,970,587 B2
(45) Date of Patent: May 15, 2018

(54) CAP FOR WATER CLOSET FLANGE

(71) Applicant: A & B Innovations, LLC, Buford, GA (US)

(72) Inventor: Lewis R. Armenta, Buford, GA (US)

(73) Assignee: AB Innovations, LLC, Sugar Hill, GA (US)

( * ) Notice: Subject to any disclaimer, the term of this patent is extended or adjusted under 35 U.S.C. 154(b) by 0 days. days.

(21) Appl. No.: 15/330,427

(22) Filed: Sep. 21, 2016

(65) Prior Publication Data

US 2018/0080594 A1  Mar. 22, 2018

(51) Int. Cl.
 *F16L 57/00* (2006.01)
 *E03D 11/18* (2006.01)
 *E03D 11/16* (2006.01)

(52) U.S. Cl.
 CPC ............ *F16L 57/005* (2013.01); *E03D 11/16* (2013.01)

(58) Field of Classification Search
 CPC .. F16L 55/115; F16L 55/1152; F16L 55/1155; F16L 55/11; F16L 55/1108; E03D 11/16
 USPC .............................. 4/580, 253, 657; 138/96 R
 See application file for complete search history.

(56) References Cited

U.S. PATENT DOCUMENTS

| 2,575,236 | A | * | 11/1951 | Slawson | ................ | A47K 3/001 |
| | | | | | | 4/580 |
| 4,233,697 | A | * | 11/1980 | Cornwall | ................ | E03D 11/16 |
| | | | | | | 138/89 |
| 5,329,971 | A | * | 7/1994 | Condon | ................... | E03D 11/16 |
| | | | | | | 138/89 |
| 5,377,361 | A | | 1/1995 | Piskula | | |
| 6,085,478 | A | | 7/2000 | Workman | | |
| 6,532,992 | B1 | | 3/2003 | Holden | | |
| 6,725,468 | B2 | | 4/2004 | Molina | | |
| 7,762,282 | B2 | * | 7/2010 | Coscarella | ............ | F16L 55/115 |
| | | | | | | 138/89 |
| 8,281,421 | B2 | | 10/2012 | Hughes | | |
| 8,443,844 | B2 | * | 5/2013 | Zeyfang | ................ | F16L 23/003 |
| | | | | | | 138/96 R |

* cited by examiner

*Primary Examiner* — Janie Loeppke
(74) *Attorney, Agent, or Firm* — Jonathan E. Gran; Grant Patent Services

(57) ABSTRACT

A cap for water closet flange which fits over the water closet flange is disclosed. The cap for water closet flange contains a round structure, the round structure contains a top surface section, the top surface section containing: first threaded screw opening, second threaded screw opening, a first screw, a second screw a side section and an underside, with the underside comprising a first projection having a first head, a second projection having a second head, a continuation of said fast threaded screw opening; and a continuation of the second threaded screw opening. The underside of the cap for water closet flange is aligned with a water closet flange. The first head of the first projection and the second head of the second projection are inserted into head slots of the water closet flange and rotated. The first screw and the second screw are screwed into position, locking the cap for the water closet flange into position.

9 Claims, 5 Drawing Sheets

CAP FOR WATER CLOSET FLANGE

The construction or remodeling of a home or other structure usually requires construction within a bathroom, or at least a powder room. During construction, the toilet is almost always one of the last items installed leaving the open sewer line and water closet flange exposed to plaster, woodchips, and other debris, which can lead to plumbing problems once the toilet is installed and put in place.

There are water closet flange covers that fit over the water closet flange to prevent workers from using the open water closet flange as a means of disposal of junk; however, all too often, workers find it easy to remove the cap and dump waste and debris down the flange.

The disclosure teaches a method of securing the sewer system whereby the cap for the water closet flange is affixed to the water closet flange which makes it more difficult to remove without authorization or before the job is complete.

The present disclosure will become more apparent upon reading of the following non-restrictive description thereof, given for the purpose of exemplification only, with reference to the accompanying drawings.

DETAILED DESCRIPTION OF THE DISCLOSURE

Figure 1:
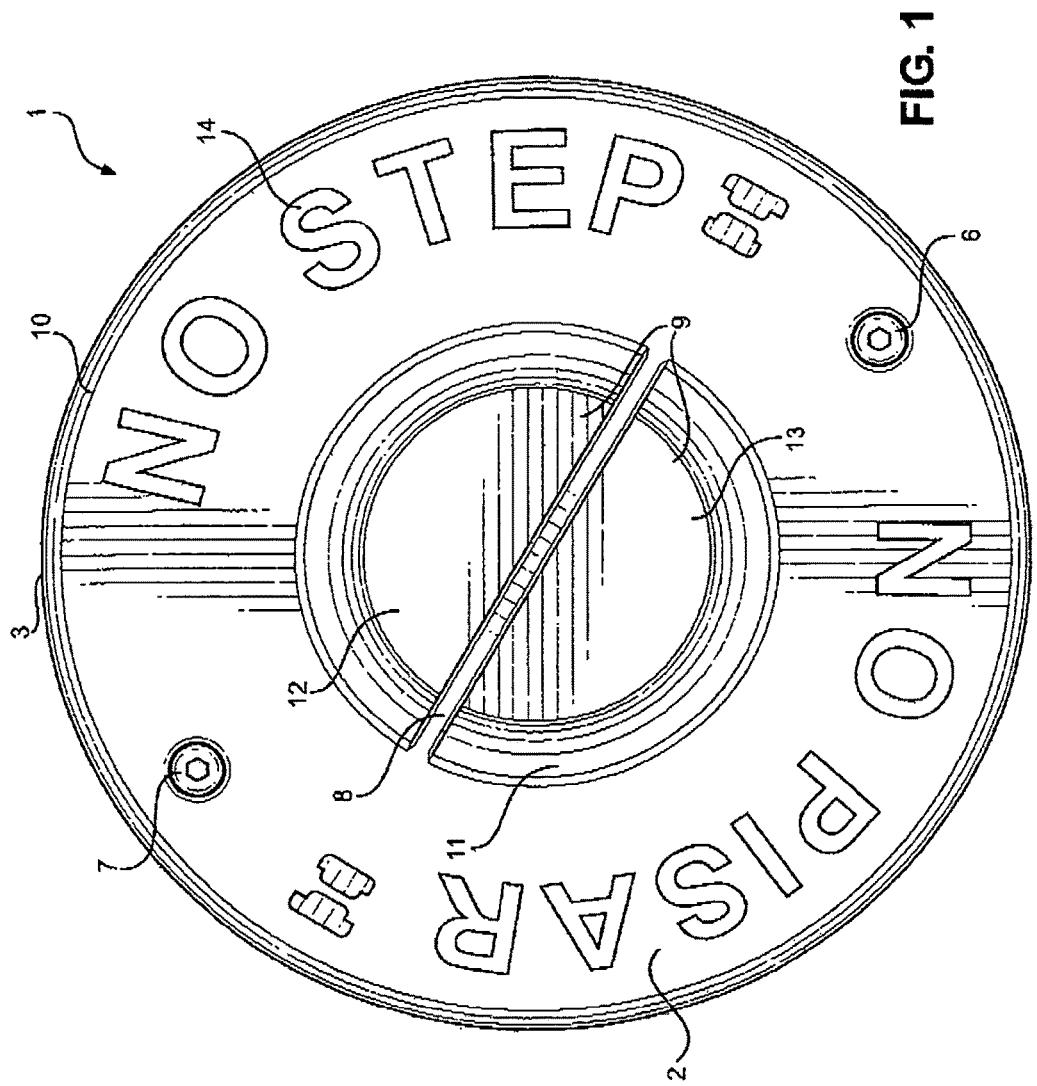
FIG. 1 is an overhead view of the cap for water closet flange.
Figure 2:
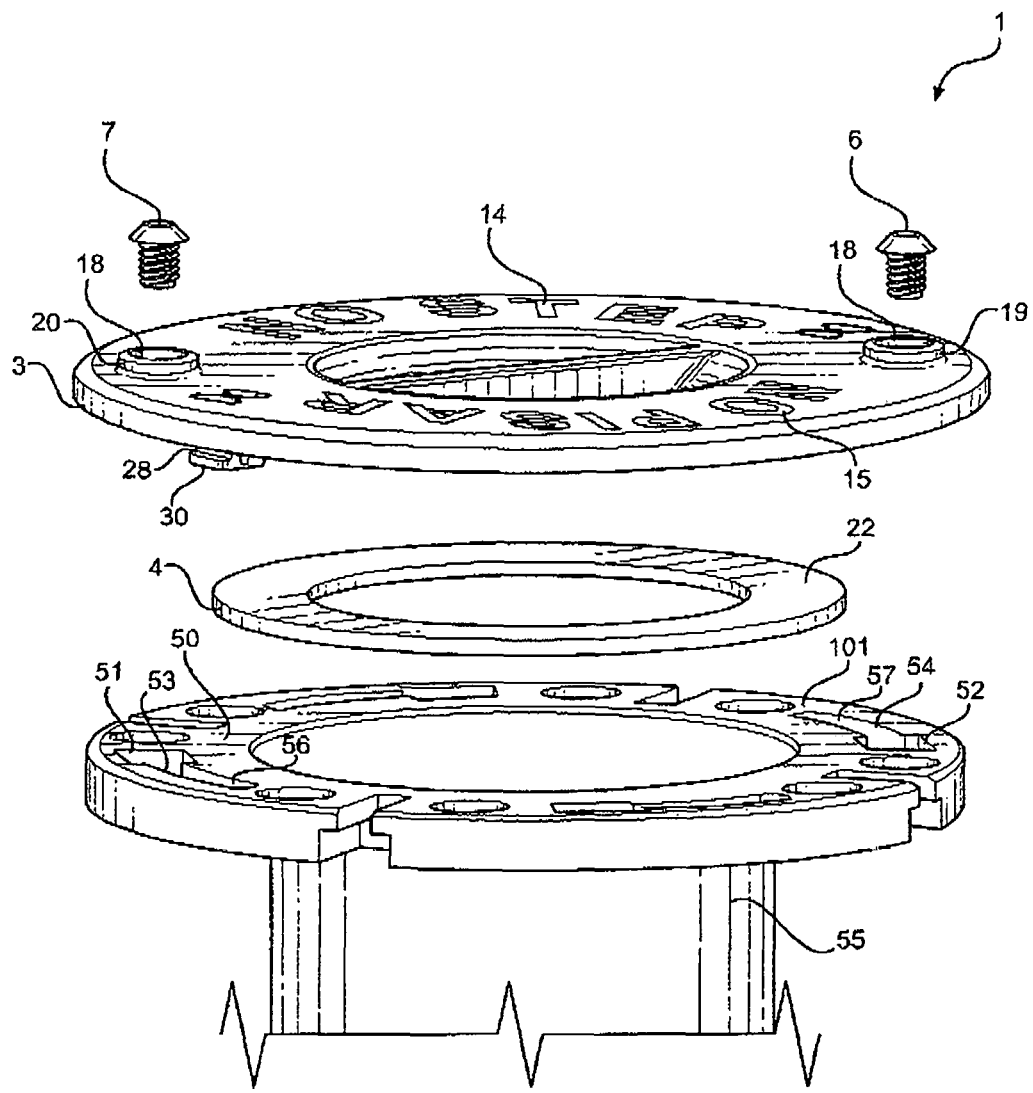
FIG. 2 is a perspective exploded view of the cap for the water closet flange and standard water closet flange used in the industry.
Figure 3:
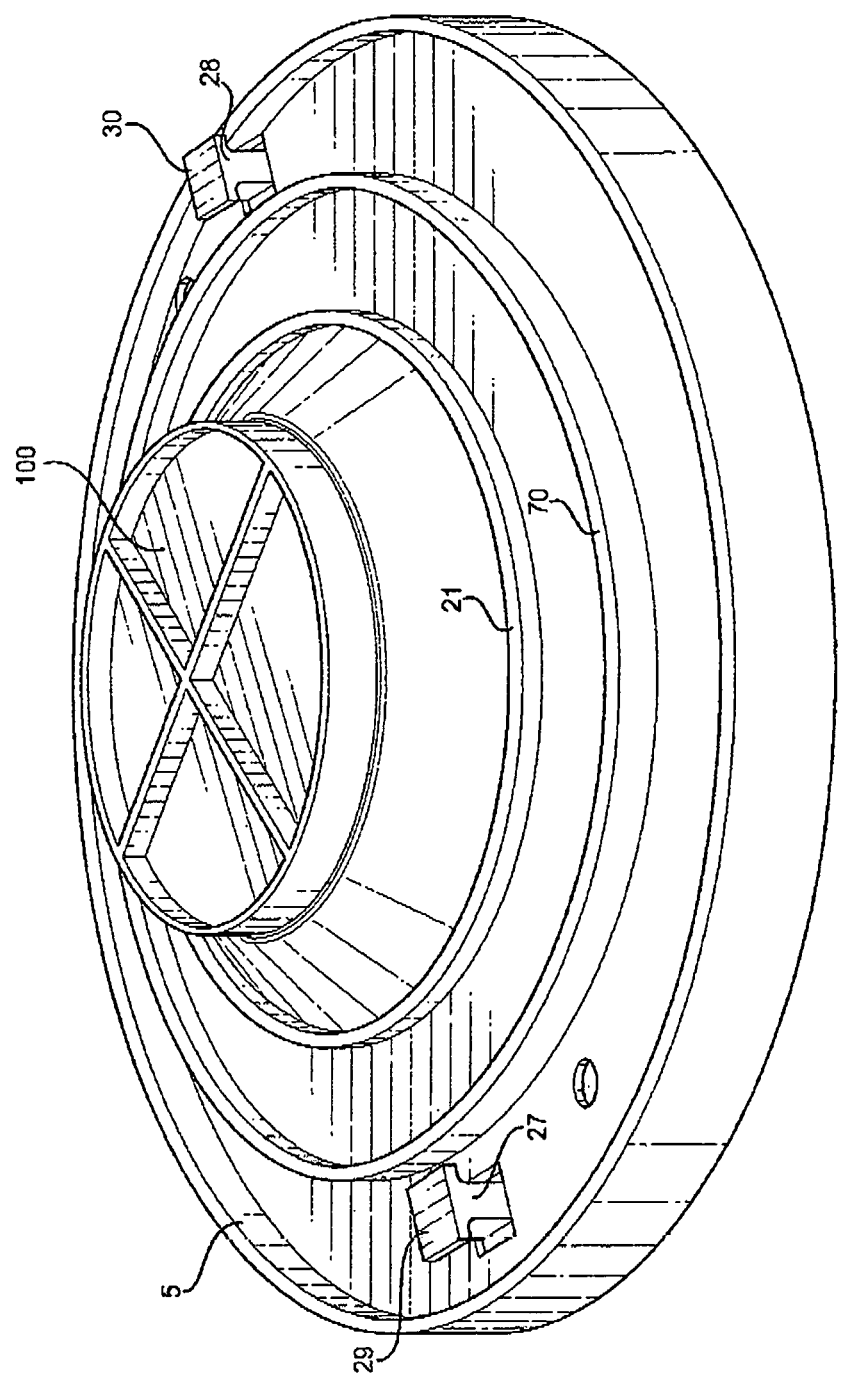
FIG. 3 is a perspective view of the underside of the cap for the water closet flange.
Figure 4:
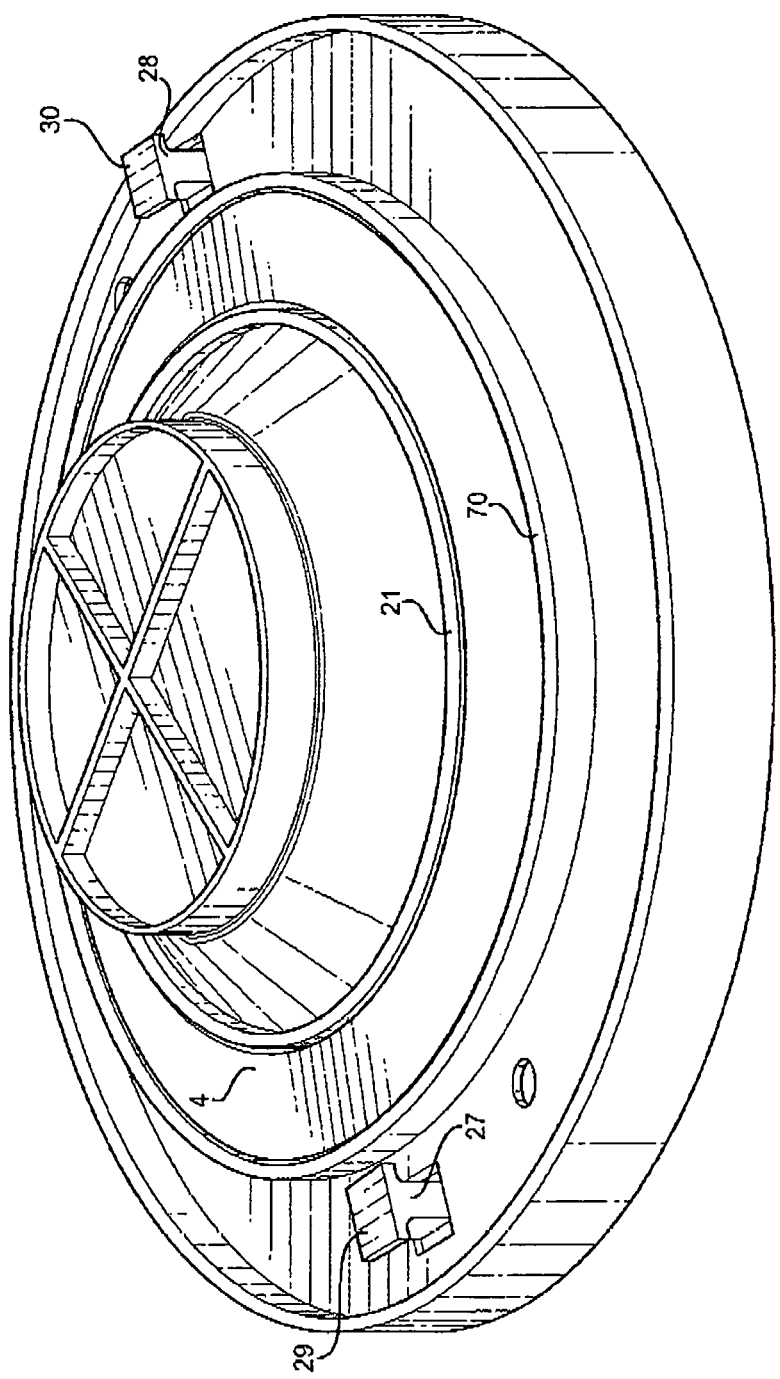
FIG. 4 is a perspective view of the of the underside view of the cap for the water closet flange with the gasket inserted.
Figure 5:
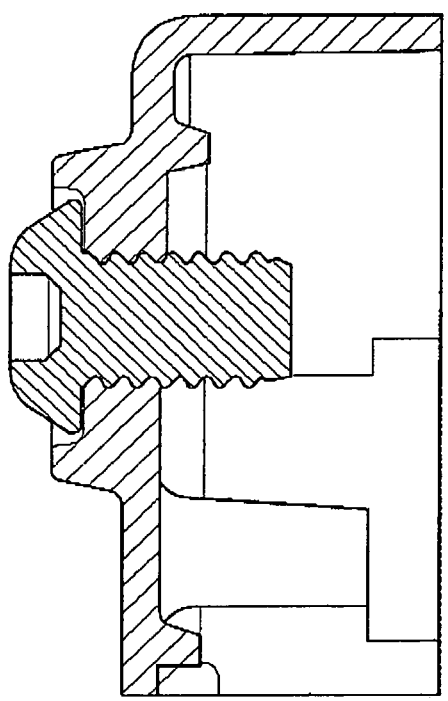
FIG. 5 is a perspective view of the screw locking the toilet trap cap in place.

The cap for water closet flange 1 is comprised of a top surface section 2, a side section 3, a rubber sealant or gasket 4, and an underside 5 of the cap for water closet flange 1. The cap for water closet flange 1 also has two screws 6, 7. The cap for water closet flange 1 is made out of a hard plastic or metal. In one embodiment, the cap for water closet flange 1 is made of plastic. The cap 1 itself is, in one embodiment, round in circumference. The main structure may be made out of one mold, separate from auxiliary parts, or the parts may be attached by methods known in the art. In one embodiment, the cap for water closet flange is from about seven inches to about eight inches wide. In another embodiment, the cap for water closet flange 1 is from about seven inches to about seven and ½ inches wide, and in another embodiment the cap is 7.25 inches wide.

The side section 3 is positioned around the edge 10 of the top surface section 2.

The top surface section 2 of the cap for water closet flange 1 has a handle 8 for holding or rotating the cap for water closet flange 1. In one embodiment, this handle 8 bisects a sunken middle section 9 of the top surface section 2 of the plate 1. In another embodiment, the middle section 9 of the top surface section 2 of the plate 1 is round. In one embodiment, the edges or walls 11 of the sunken middle section are inwardly inclined, such that in one embodiment, two half sections 12, 13 are created, having inclined walls, except for the handle 8.

Returning to the original embodiment, in one embodiment, the words, "NO STEP" 14 are imprinted on the top surface section 2 of the cap for water closet flange 1. These words can be either printed in ink, formed by an indentation of the top surface section 2 of the cap for water closet flange 1 or they can be indented and inked. In another embodiment, given the presence of undocumented and foreign workers in the construction industry, there is a second printing and/or imprinting of the words "NO PISAR" 15 on the top surface 10 of the cap for water closet flange 1. In one embodiment, the words "NO PISAR" 15 appear on the cap opposite the words "NO STEP" 14 In another embodiment, only the words "NO PISAR" 15 appear, and in yet another embodiment, the words, "NO PISAR" appear twice on the cap opposite each other. In another embodiment words can be in English, or any other language. Other words or phrasing such as "CAUTION," "DO NOT STEP" or similar safety notices can be substituted for "NO STEP."

The words "NO STEP" or even "NO STEPPING" are obviously used to prevent people from stepping on and breaking the cap for water closet flange 1 which could potentially damage the water closet flange beneath (55) as well as damage the cap itself. In one embodiment, the cap for water closet flange 1 is strong enough to withstand the weight of an average man.

There are other notable features on the top surface section 2 of the cap for water closet flange 1. In one embodiment, there are two holes 17, 18 perpendicular to and going through the top surface section 2. In one embodiment, these holes are positioned on opposite sides of the top surface section 2. In yet another embodiment, there are two support mounds 19, 20 through which the screws 6, 7 pass. In one embodiment the holes 17, 18 are threaded. In one embodiment, the screws are ¼-20×⅜ HD cap screws. To screw in or remove the screws a T27 Pin-in-Torx head bit is required. Other screws can be used at the users discretion, but the use of supplied screws with security headed (T27 Pin-in-Torx) screws are intended to make it more difficult for workmen to remove the cap for water closet flange.

On the underside 5 of the cap for water closet flange 1 is a centered rim 21 which is sized to fit within the inside of a water closet flange which surrounds an elevated center section 100. In one embodiment the central rim 21 is just slightly smaller than the width of the central opening or piping of the water closet flange 55, around the centered rim 21 is a seal or gasket 4. The gasket 4 has a flat surface 22 fitted against the underside 5 of the cap for water closet flange 1. In another embodiment, there is a second outer rim 70 such that the gasket 4 is positioned securely between the centered flat rim 21 and the outer rim 70. The center of the underside comprises a stunted conical structure 100 which can fit over the opening, and slight within the piping of the water closet flange. The gasket width itself can vary but in the present case is 0.704 inches. The distance between the outside wall of rim 70 to the inside wall of the outer rim is 0.98 inches, and to the outside wall of the outer rim 1.06 inches.

The body of the cap for water closet flange 1 is from about 0.4 inches to about 0.7 inches in height. In another embodiment, the walls are about 0.5 inches to about 0.6 inches in height and in another embodiment, the height is about 0.570 inches. All dimensions given for this device can be varied, as required for design, manufacturing and need. The addition of the support mounds raises the height to about 0.693 inches. Again, the measurements may vary and this height could range from about 0.6 inches to about 0.7 inches. With the addition of the of the conical structure 100, the height of the structure ranges from about 0.8 inches to about 1 inch, and in another embodiment from about 0.8 inches to about 0.9 inches. In one embodiment, the height is 0.813 inches.

Holes 17, 18 are clearly visible passing through the underside 5.

Additionally, there are two projections 27, 28 having heads 29, 30 extending from the underside 5 of the cap for water closet flange. These heads 29, 30 fit within the notches 51, 52 of the slots 53, 54 of the rim 50 of the water closet flange 55. These head are about the length of the height of the body of the cap for water closet flange.

To use the cap for water closet flange 1, the cap for water closet flange 1 is placed over the water closet flange 55 with the underside 5 facing the water closet flange 55. The heads 29, 30, are lined up and fitted into the head slots 53, 54. The cap for water closet flange 1 is then rotated until projections are positioned against the ends 56, 57 of the head slots 53, 54. This secures the cap for water closet flange 1 in place; however, it is still easy to "unrotate" the cap allowing workmen to dump garbage into the piping leading from the flange.

At this point, the screw holes 17, 18 are aligned with the notches 51, 52, once the heads 29, 30 are in place and rotated and positioned against the ends 56, 57 of the head slots 53, 54. Screws 6, 7 are screwed through screw holes 17, 18. The ends of the screws, when screwed in completely, extend into slots 51 and 52 preventing the cap from being rotated back to align heads 29 and 30 with slots 53 and 54, thus preventing removal. Because the screws being used, and a special tool is needed for the screws is less common than those usually found in a construction site, it is harder for a worker to easily remove the cap for water closet flange 1. Less common screws and tools may be used, or, inversely, more common screws and tools can be used. It is to be pointed out that even if regular or common straight or Philips head screws are used instead of the Pin-in-Torx cap screws, it is still much more of an effort to remove the cap for water closet flange 1 than if there were no screws whatsoever. Once the screws are in, the cap for water closet flange cannot be rotated and removed without removing the screws.

By making it more difficult to remove the cap for water closet flange 1, it is less likely that workers will be able to toss trash or dispose of waste into the sewer line, leading to possible clogging.

It is to be understood that even though numerous characteristics and advantages of the present embodiments have been set forth in the foregoing description with details of the structures and functions of the embodiments, the disclosure is illustrative only, and changes made in detail, especially in matters of shape, size, and arrangement of parts, within the principles of the embodiments, to the full extent indicated by the broad general meaning of the terms in which the appended claims are expressed.

I claim:

1. A cap for a water closet flange, said comprising a round structure, said round structure comprising:
    a) top surface section, said top surface section comprising:
        i) a first threaded screw opening;
        ii) a second threaded screw opening;
    b) a first screw;
    c) a second screw;
    d) a side section;
    e) an underside allowing for alignment with the water closet flange, said underside comprising:
        i) a first projection having a first head having the ability of being inserted into a first head slot of said water closet flange;
        ii) a second projection having a second head having the ability of being inserted into a second head slot of said water closet flange, such that said cap has the ability to be rotated on said water closet flange with the insertion of said first projection and said second projection;
        III) a continuation of said first threaded screw opening; and
        iv) a continuation of said second threaded screw opening;
    and wherein said first screw and said second screw, have the ability to lock said cap for the water closet flange into position.

2. The cap for the water closet flange of claim 1, further comprising a centered handle on said top surface section.

3. The cap for the water closet flange of claim 2, wherein said centered handle is positioned in a sunken center of said top surface section.

4. The cap for the water closet flange of claim 1, further comprising:
    a) a first support mound positioned over said first threaded screw opening, said first support mound having a first support mound threaded screw opening which aligns with, said first threaded screw opening;
    b) a second support mound positioned over said second threaded screw opening, said second support mound having a second support mounded threaded screw opening which aligns with said first threaded screw opening.

5. The cap for the water closet flange of claim 1, further comprising indicia warning users not to stand on said cap for the water closet flange.

6. The cap for the water closet flange of claim 1, further comprising a central rim on said underside, said central rim being slightly smaller than a width of a water closet flange opening such that said central rim fits within said water closet flange opening.

7. The cap for the water closet flange of claim 6, further comprising a gasket around said central rim.

8. The cap for the water closet flange of claim 7, wherein said underside further comprises an outer rim, wherein said gasket fits between said central rim and said outer rim.

9. The cap for the water closet flange of claim 1, wherein said screws are security head bit screws.

\* \* \* \* \*